United States Patent
Huang

(10) Patent No.: US 7,242,369 B2
(45) Date of Patent: Jul. 10, 2007

(54) METHOD OF DISPLAYING TEXT ON MULTIPLE DISPLAY DEVICES

(75) Inventor: Fu-Yuan Huang, Tai-Nan (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 379 days.

(21) Appl. No.: 10/904,134

(22) Filed: Oct. 26, 2004

(65) Prior Publication Data

US 2006/0097954 A1    May 11, 2006

(51) Int. Cl.
    *G09G 5/00*    (2006.01)
(52) U.S. Cl. .................................... 345/1.1; 345/103
(58) Field of Classification Search .......... 345/1.1–2.3, 345/103, 901
    See application file for complete search history.

(56) References Cited

U.S. PATENT DOCUMENTS

| | | | | |
|---|---|---|---|---|
| 5,467,102 A * | 11/1995 | Kuno et al. ................. | 345/1.3 |
| 5,734,513 A * | 3/1998 | Wang et al. ................ | 359/742 |
| 6,088,220 A * | 7/2000 | Katz ........................... | 361/680 |
| 6,144,358 A * | 11/2000 | Narayanaswamy et al. . | 345/102 |
| 6,327,482 B1 * | 12/2001 | Miyashita .................... | 455/566 |
| 6,390,371 B1 * | 5/2002 | Armga et al. ............. | 235/472.01 |
| 6,628,244 B1 * | 9/2003 | Hirosawa et al. ............. | 345/2.3 |
| 6,825,830 B1 * | 11/2004 | Kanesaka et al. ........... | 345/156 |
| 7,127,673 B2 * | 10/2006 | Iwata et al. .................. | 715/517 |
| 2003/0189529 A1 * | 10/2003 | Martinez et al. ............. | 345/1.3 |
| 2005/0212716 A1 * | 9/2005 | Feigel et al. ................. | 345/1.1 |
| 2006/0001593 A1 * | 1/2006 | Baudisch ..................... | 345/1.1 |
| 2006/0033712 A1 * | 2/2006 | Baudisch et al. ........... | 345/157 |

\* cited by examiner

*Primary Examiner*—Sumati Lefkowitz
*Assistant Examiner*—Rodney Amadiz
(74) *Attorney, Agent, or Firm*—Winston Hsu

(57) ABSTRACT

A method of displaying text on multiple display devices. The multiple display devices include a master device with a master display and at least one slave device with a slave display. The method includes establishing communication between the master device and the slave device, dividing the text into a first part and a second part based on a first display dimension of the master display and a second display dimension of the slave display, transmitting the second part to the slave device, and simultaneously displaying the first part on the master display and the second part on the slave display. For each individual row of text that is displayed on both the master display and the slave display, a fraction of text is displayed on the master display and a remaining fraction of text is displayed on the slave display.

15 Claims, 6 Drawing Sheets

METHOD OF DISPLAYING TEXT ON MULTIPLE DISPLAY DEVICES

BACKGROUND OF INVENTION

1. Field of the Invention

The present invention relates to display devices, and more specifically, to a method for utilizing multiple display devices to display a single text.

2. Description of the Prior Art

The popularity of electronic devices and portable computing devices allows people to access information anywhere. Electronic devices such as mobile phones, personal digital assistants (PDAs), and other personal computing devices can be used to read documents in any location.

Please refer to FIG. 1. FIG. 1 is a diagram of a mobile phone 10 according to the prior art. The mobile phone 10 contains a display 12 such as a liquid crystal display (LCD) that is used to display text and images. As shown in FIG. 1, the display 12 currently shows a text message. Unfortunately, the dimensions of the display 12 limit the amount of text that can be displayed at one time. Typical displays have a limited number of columns and rows that can be used to display text characters. While text documents can still be read on the display 12 of the mobile phone 10, the limited dimensions of the display 12 mean that a user of the mobile phone 10 has to constantly scroll down to read a next screen of text. As an example, FIG. 1 depicts the display 12 as only being able to show the words, "The quick brown fox jumps over the lazy dog."

Although FIG. 1 shows a mobile phone 10, the small dimensions of the display 12 of the mobile phone 10 are representative of the problems of small displays used on other electronic devices such as PDAs.

SUMMARY OF INVENTION

It is therefore an objective of the claimed invention to provide a method of displaying text on displays of multiple electronic devices.

According to the claimed invention, a method of displaying text on multiple display devices is proposed. The multiple display devices include a master device with a master display and at least one slave device with a slave display. The method includes establishing communication between the master device and the slave device, dividing the text into a first part and a second part based on a first display dimension of the master display and a second display dimension of the slave display, transmitting the second part to the slave device, and simultaneously displaying the first part on the master display and the second part on the slave display. For each individual row of text that is displayed on both the master display and the slave display, a fraction of text is displayed on the master display and a remaining fraction of text is displayed on the slave display.

It is an advantage of the claimed invention that multiple display devices can be used to show a text document for allowing a large amount of text to be viewed at one time.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
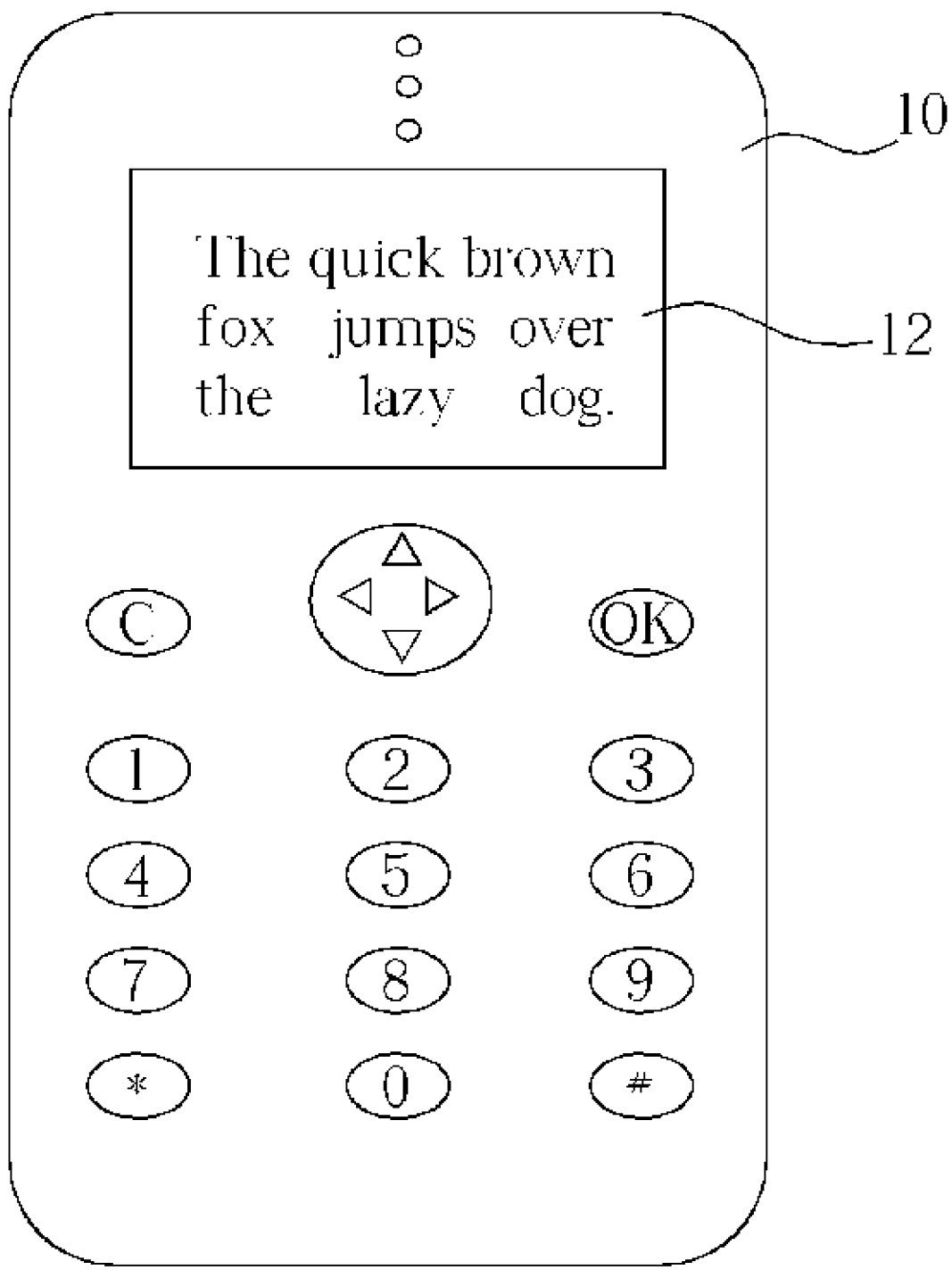
FIG. 1 is a diagram of a mobile phone according to the prior art.
Figure 2:
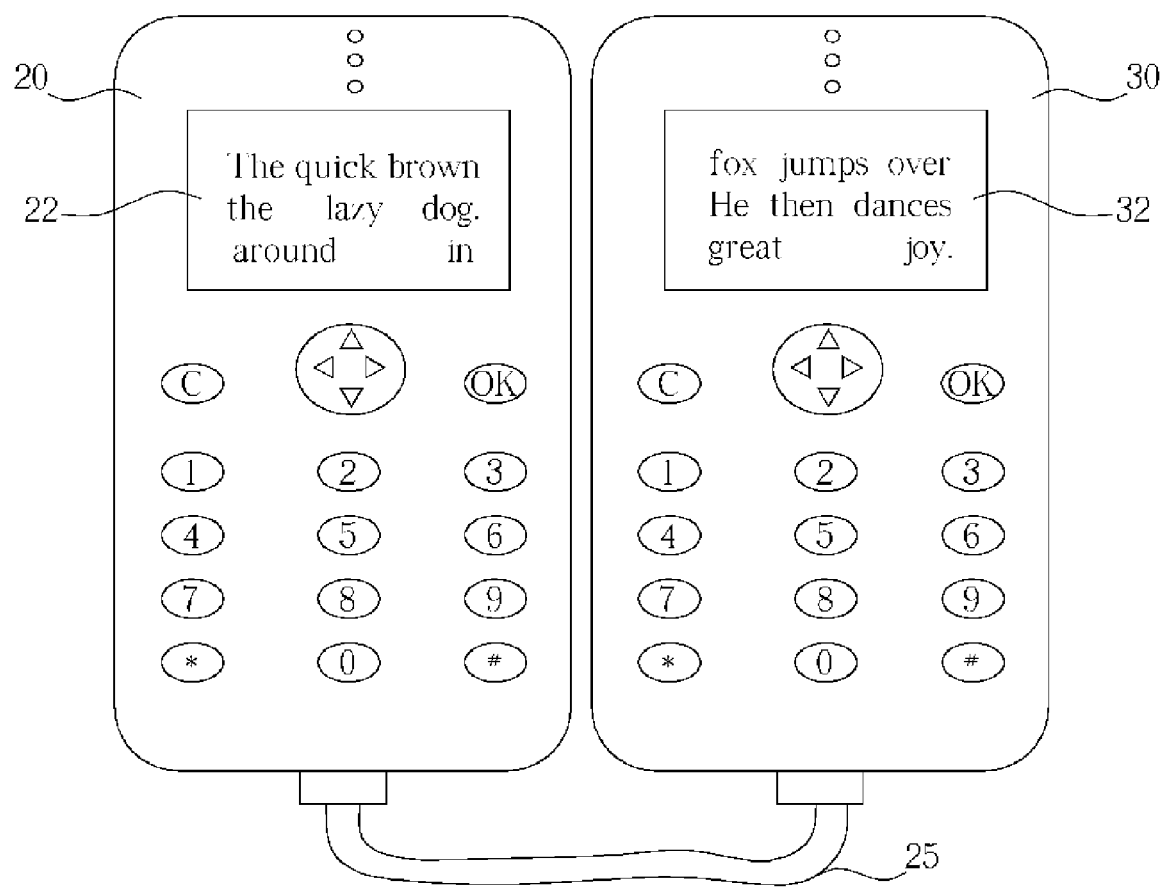
FIG. 2 is a diagram of a master device and a slave device connected together to display a single text document.

Please refer to FIG. 2. FIG. 2 is a diagram of a master device 20 and a slave device 30 connected together to display a single text document. The master device 20 has a master display 22 and the slave device 30 has a slave display 32 for displaying text. Although mobile phones are depicted in FIG. 2, the present invention method may be used with any electronic device that contains a display. The present invention is particularly useful for portable electronic devices without a large display such as mobile phones, PDAs, and personal computing devices.

The master device 20 and the slave device 30 are connected together with a cable 25 to allow communication between the master device 20 and the slave device 30. The master device 20 and the slave device 30 preferably communicate with a serial connection, although other communication protocols may also be used. In addition, the master device 20 and the slave device 30 may communicate wirelessly instead of using the cable 25.

The present invention allows the master display 22 to be used in conjunction with the slave display 32 to display a common text document. As shown in FIG. 2, the master display 22 and the slave display 32 show the words, "The quick brown fox jumps over the lazy dog. He then dances around in great joy." If the master display 22 and the slave display 32 have the same number of columns and rows for displaying text, then half of each row of text is displayed on the master display 22 and the other half of each row of text is displayed on the slave display 32. As will be shown below, the present invention method can also be used in cases where the dimensions of the master display 22 and the slave display 32 are different from each other. Please note that the master display 22 does not have to be used for displaying a left-hand side portion of the text. It is also possible to switch the position of the master device 20 and the slave device 30 so that the slave display 32 is used to display a left-hand side portion of the text and the master display 22 is used to display a right-hand side portion of the text.

Figure 3:
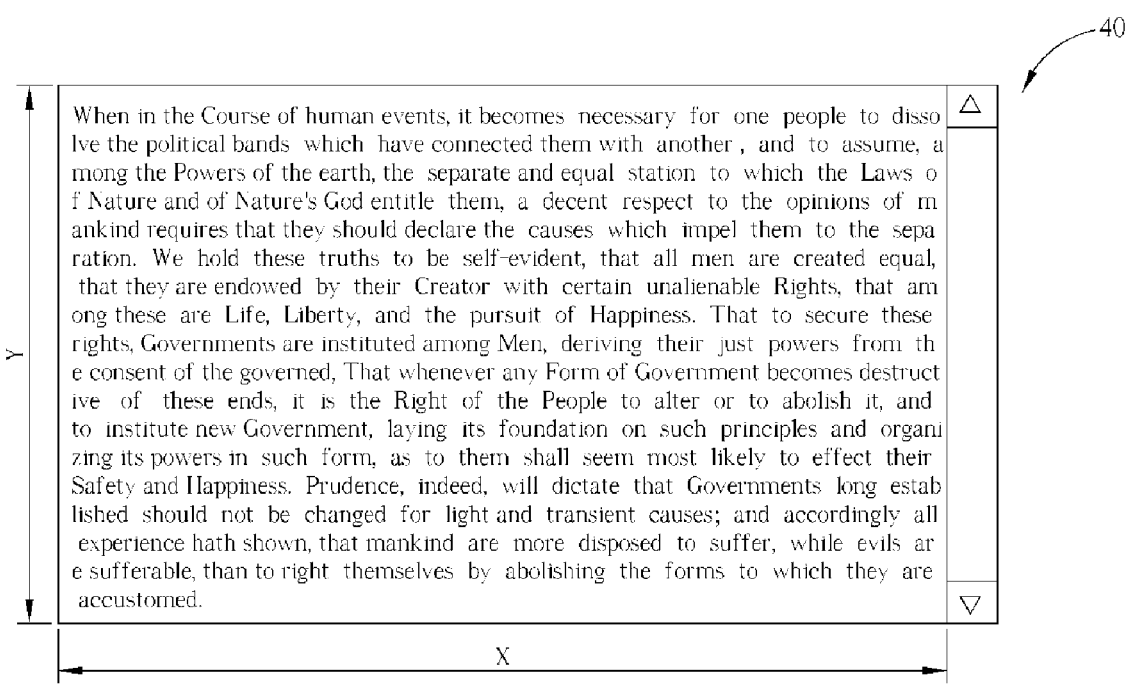
FIG. 3 is a figure of text displayed on a PC console.

Please refer to FIG. 3. FIG. 3 is a figure of text displayed on a PC console 40. The PC console 40 shown has dimensions of X columns and Y rows, which in this case is shown as 80 columns by 18 rows. Standard dimensions for a PC console may be 80 columns by 25 rows, but a smaller size is shown on FIG. 3 for clarity of illustration. The PC console 40 shown is a simplified version that performs character wrapping, which does not keep whole words together, and simply moves text to the next row whenever the end of a row is reached.

Figure 4:
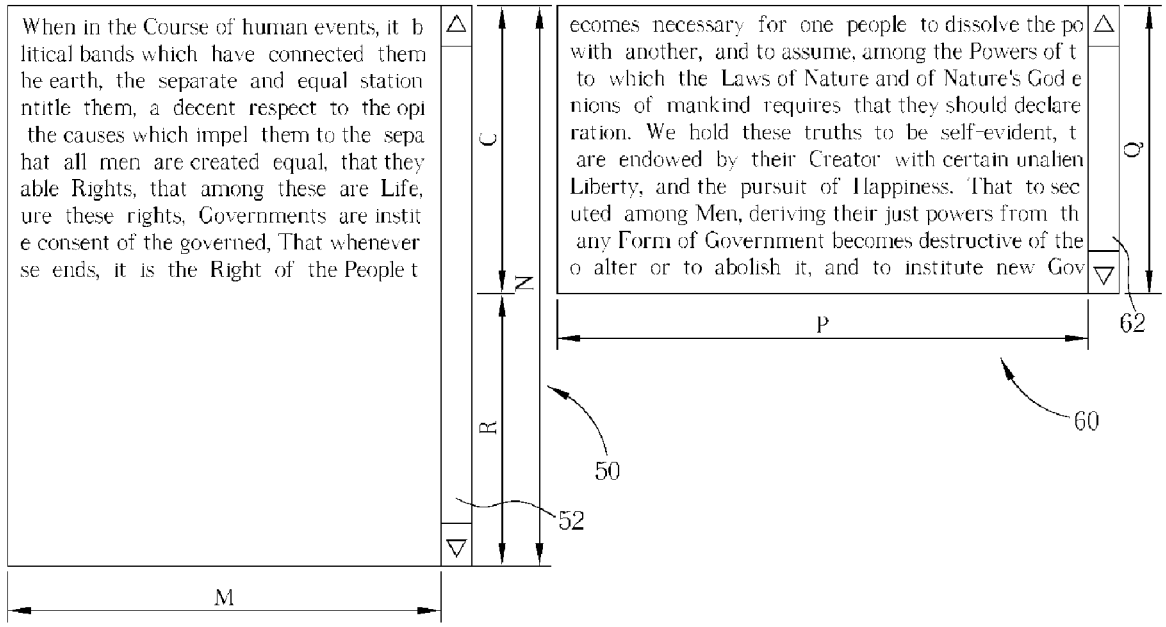
FIG. 4 and FIG. 5 show pages of text displayed on multiple display devices according to the present invention.
Figure 5:
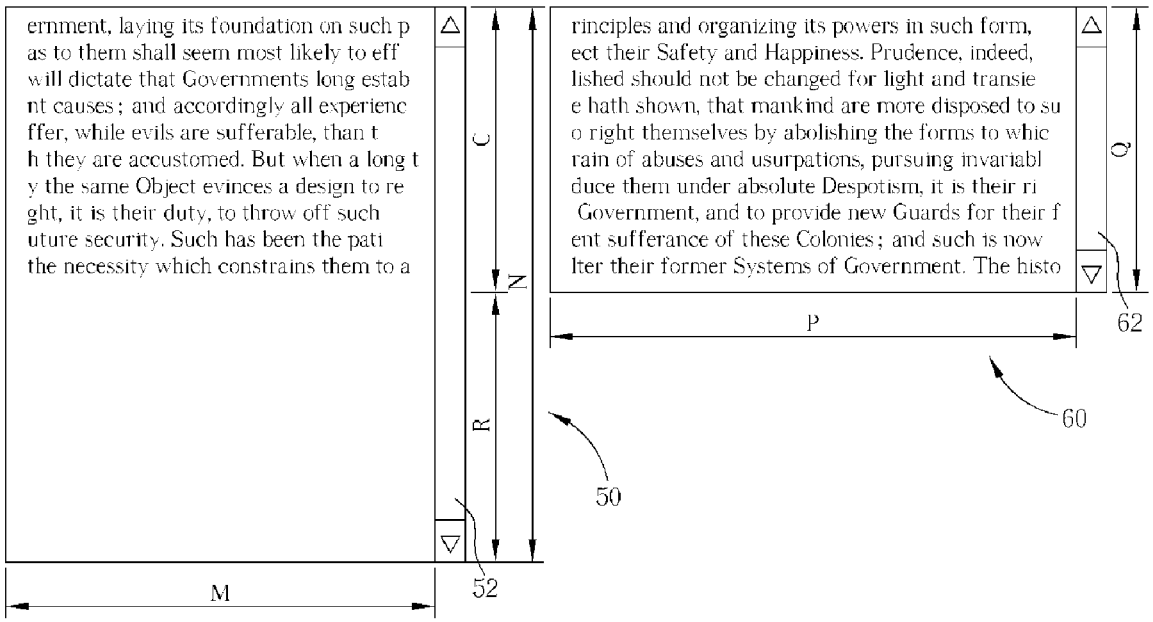

Please refer to FIG. 4 and FIG. 5. FIG. 4 and FIG. 5 show pages of text displayed on multiple display devices according to the present invention. FIG. 4 illustrates a first combined page of text shown on a first display 50 and a second display 60. The first display 50 represents either the master display 22 or the slave display 32, with the second display 60 representing the other of the master display 22 and the slave display 32. The first display 50 has dimensions of M columns by N rows, which is shown in FIG. 4 and FIG. 5 as 40 columns by 20 rows. The second display 60 has dimensions of P columns by Q rows, which is shown in FIG. 4 and FIG. 5 as 50 columns by 10 rows. FIG. 4 and FIG. 5 illustrate a case of displaying text on the first display 50 and the second display 60 when the dimensions of the first display 50 and the second display 60 are not equal. The case in which the dimensions are equal will naturally follow from understanding this relatively more difficult case. Like the PC console 40 of FIG. 3, the first display 50 and the second display 60 shown in FIG. 4 and FIG. 5 also perform character wrapping. This means that at the end of the line, whole words are not kept together, and text is simply cut off when the end of a row is reached. Please note, however, that the present invention is not limited to this and, word wrapping in which words are kept together, can also be used according to the wishes of the designer or manufacturer.

When using a combination of both the first display 50 and the second display 60 to display a text document, it is recommended to line up the top borders of the first display 50 and the second display 60 so that the first row of text is aligned. Although the first display 50 can display more rows than the second display 60, the smaller row dimension of the first and second displays 50 and 60 will control how many rows of text appear on each page. Therefore, as shown in FIG. 4 and FIG. 5, only ten rows of text are displayed at a time.

For clarity, two additional labels will be defined for showing how text is divided between the first display 50 and the second display 60. Let C be equal to the smaller of Q and N (in this case C=Q), where C represents the number of rows that will be used to display text using a combination of the first display 50 and the second display 60. Let R be equal to the longer of N and Q, minus C (in this case R=N−C), where R represents a remaining number of rows that are not used to display text.

Once the values of M, N, P, Q, C and R are known, the master device 20 divides the text document into pages of text. This is done by displaying M characters of text on the first display 50 and P characters of text on the second display 60 for each of C rows of text.

When a user is finished reading the first combined page of text shown on FIG. 4, scroll buttons 52 and 62 on either the first display 50 or the second display 60 (or corresponding key buttons on either the master device 20 or the slave device 30) may be pressed to scroll down to a second combined page of text that is shown on FIG. 5. The scroll buttons 52 and 62 may be used to scroll up or down in a text document. Each time the scroll buttons 52 and 62 are pressed, a new page of text is shown on both the first display 50 and the second display 60.

Figure 6:
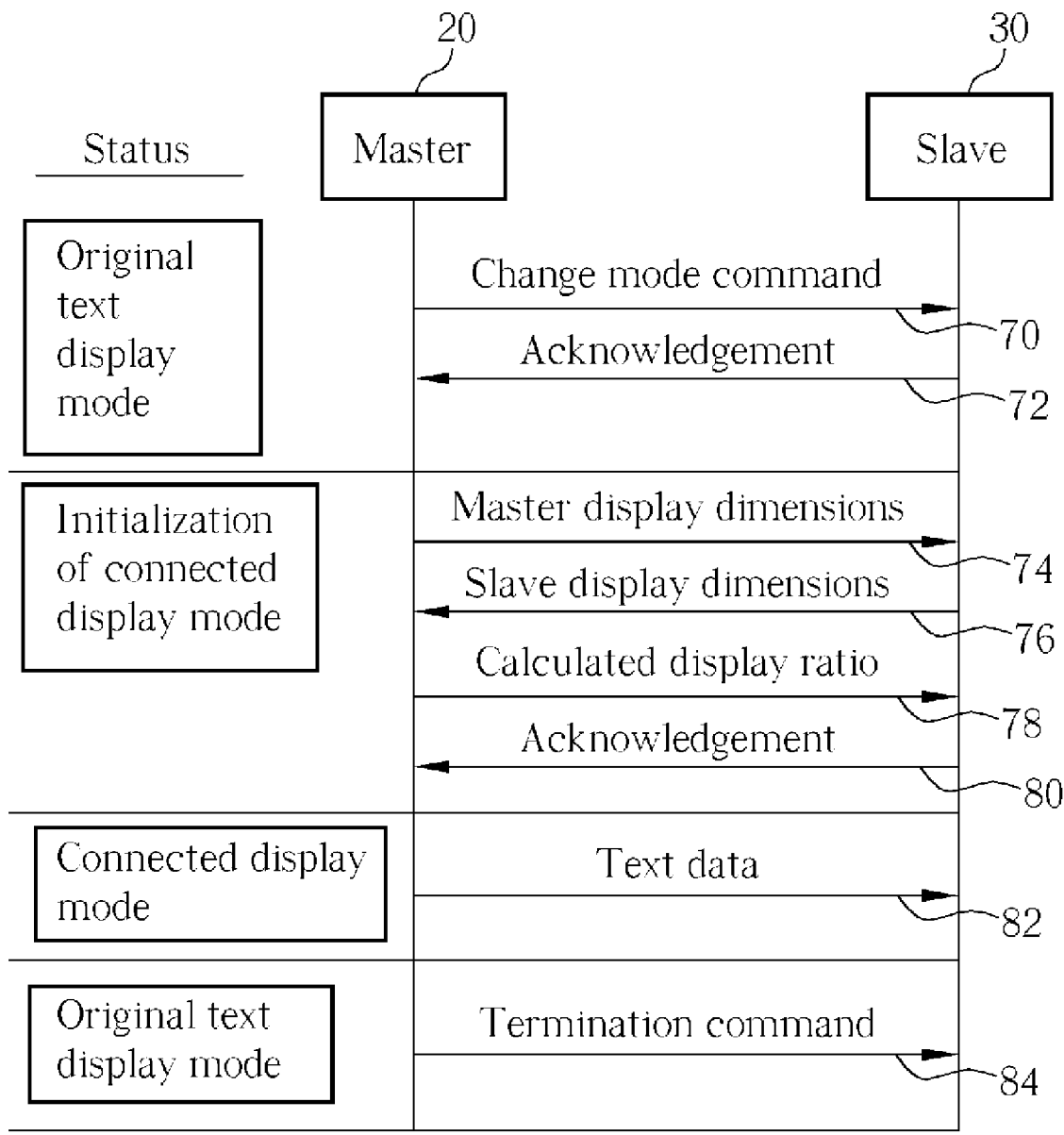
FIG. 6 is a message sequence chart illustrating commands sent between the master device and the slave device according to the present invention.

Please refer to FIG. 6. FIG. 6 is a message sequence chart illustrating commands sent between the master device 20 and the slave device 30 according to the present invention. The status of the text display mode is also indicated in a left-hand side of FIG. 6.

Initially, the master device 20 and the slave device 30 are in an original text display mode in which the master display 22 and the slave display 32 are each displaying respective data corresponding to the master device 20 and the slave device 30. At this time the master device 20 begins serially communicating with the slave device 30 wirelessly or using the cable 25. The master device 20 then sends command 70 to the slave device 30 for changing the display mode to a connected display mode. The slave device 30 responds with an acknowledgement command 72.

Next, the connected display mode is initialized. The master device 20 sends command 74 to the slave device 30 to ask the slave device 30 for the dimensions of the slave display 32. The slave device 30 responds by sending the dimensions of the slave display 32 in command 76. The master device 20 may also indicate the dimension of the master display 22 to the slave device selectively. The master device 20 then calculates the display ratio that will be used in the connected display mode and sends the calculated display ratio to the slave device 30 in command 78. The display ratio indicates how many characters of text will be displayed on the master display 22 and the slave display 32 for each row of text. The master device 20 only needs to send the dimensions that apply to the slave display 32 to the slave device 30, and can also optionally send the dimensions that apply to the master display 22. In this way, the slave device is made aware of how many characters of text it will display for each row of text. In response to command 78, the slave device 30 responds with an acknowledgement command 80.

At this time the master device 20 and the slave device 30 are in connected display mode. The master device 20 sends text data in command 82 to the slave device 30, and text data is simultaneously displayed on the master display 22 and the slave display 32. This continues until the master device 20 sends a termination command 84 to the slave device 30, which switches the master device 20 and the slave device 30 back to the original text display mode.

The present invention method is not limited to being used in just two display devices. Using three or more display devices to display text in combination with each other is also in the spirit of the present invention. In this case, the master device simply needs to know the dimensions of each of the slave displays for dividing the text document among the multiple displays.

In contrast to the prior art, the present invention method utilizes multiple display devices to display a text document, thereby allowing a large amount of text to be viewed at one time. Any size display devices can be used, and the display devices do not need to have the same dimensions.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of displaying text on multiple display devices, the multiple display devices comprising a master device with a master display and at least one slave device with a slave display, the method comprising:

establishing communication between the master device and the slave device;

dividing the text into a first part and a second part based on a first display dimension of the master display and a second display dimension of the slave display;

transmitting the second part to the slave device; and simultaneously displaying the first part on the master display and the second part on the slave display;

wherein for each individual row of text that is displayed on both the master display and the slave display, a fraction of text is displayed on the master display and a remaining fraction of text is displayed on the slave display, wherein the master display has N number of rows, the slave display has Q number of rows, and the number of rows of the first display dimension and that of the second display dimension is chosen from the smaller of N and Q, wherein N and Q are both positive integers.

2. The method of claim 1, further comprising transmitting dimensions of the slave display to the master device.

3. The method of claim 1 wherein if a scroll up or scroll down button on either the master device or the slave device is pressed, a new page of text is displayed on the master display and the slave display.

4. The method of claim 1 wherein the master device and the slave device communicate serially.

5. The method of claim 4 wherein a wired cable connects the master device to the slave device to facilitate serial communication.

6. The method of claim 4 wherein the master device communicates with the slave device through a wireless serial connection.

7. The method of claim 1 wherein the master device and the slave device are selected from a group consisting of a mobile phone, a personal digital assistant (PDA), and a personal computing device.

8. A method of displaying text on multiple display devices, the multiple display devices comprising a master device with a master display and at least one slave device with a slave display, the method comprising:

establishing communication between the master device and the slave device;

dividing the text into a first part and a second part based on a first display dimension of the master display and a second display dimension of the slave display;

transmitting the second part to the slave device; and simultaneously displaying the first part on the master display and the second part on the slave display;

wherein each individual row of text is displayed in combination on both the master display and the slave display, and a fraction of text is displayed on the master display and a remaining fraction of text is displayed on the slave display, wherein individual rows of text comprise M characters displayed on the master display and P characters displayed on the slave display, M and P being unequal positive integers, and each character of text is displayed on one colunm of a either the master display or the slave display, wherein the master display has N number of rows, the slave display has Q number of row, and the number of row of the first display dimension and that of the second display dimension is chosen from the smaller of N and Q, wherein N and Q are both positive integers.

9. The method of claim 8, further comprising transmitting dimensions of the slave display to the master device.

10. The method of claim 8 wherein the master device dividing the text into the first part and the second part comprises:

setting a number of columns of text that the master display is capable of displaying to be equal to M;

setting a number of rows of text that the master display is capable of displaying to be equal to N;

setting a number of columns of text that the slave display is capable of displaying to be equal to P;

setting a number of rows of text that the slave display is capable of displaying to be equal to Q, wherein M, N, P, and Q are all positive integers;

setting a smaller of N and Q to be equal to C for representing the number of rows of text that the master display and the slave display are capable of displaying in combination;

setting a difference of N and Q to be equal to R for representing a remaining number of rows on either the master display or the slave display that will not be used to display text in combination with the other of the master display and the slave display; and displaying M characters of text on the master display and P characters of text on the slave display for each of C rows of text.

11. The method of claim 8 wherein if a scroll up or scroll down button on either the master device or the slave device is pressed, a new page of text is displayed on the master display and the slave display.

12. The method of claim 8 wherein the master device and the slave device communicate serially.

13. The method of claim 12 wherein a wired cable connects the master device to the slave device to facilitate serial communication.

14. The method of claim 12 wherein the master device communicates with the slave device through a wireless serial connection.

15. The method of claim 8 wherein the master device and the slave device are selected from a group consisting of a mobile phone, a personal digital assistant (PDA), and a personal computing device.

* * * * *